United States Patent [19]

Haller

[11] Patent Number: 4,718,377
[45] Date of Patent: Jan. 12, 1988

[54] DEVICE FOR PLACING A CYLINDRICAL BODY, ESPECIALLY A SLEEVE, IN A TUBE OF A STEAM GENERATOR

[75] Inventor: Hans Haller, Mannheim, Fed. Rep. of Germany

[73] Assignee: Brown Boveri Reaktor GmbH, Mannheim, Fed. Rep. of Germany

[21] Appl. No.: 833,267

[22] Filed: Feb. 24, 1986

[30] Foreign Application Priority Data

Mar. 14, 1985 [DE] Fed. Rep. of Germany ....... 3509177

[51] Int. Cl.⁴ .............................................. F22B 37/24
[52] U.S. Cl. .................................... 122/510; 122/379; 122/512; 122/DIG. 14; 165/11.2; 165/76; 414/746
[58] Field of Search ............... 122/360, 361, 379, 510, 122/511, 512, DIG. 14, 504; 165/11.2, 76; 414/746

[56] References Cited

U.S. PATENT DOCUMENTS

| | | | |
|---|---|---|---|
| 3,935,951 | 2/1976 | Claus et al. | 414/746 |
| 3,958,698 | 5/1976 | van der Woerd | 414/746 |
| 4,205,939 | 6/1980 | Reyes | 165/76 X |
| 4,212,583 | 7/1980 | Gebelin | 165/76 X |
| 4,406,856 | 9/1983 | Wilkins et al. | 165/76 X |
| 4,438,805 | 3/1984 | Gugel | 165/11.2 |
| 4,543,711 | 10/1985 | Wada et al. | 414/746 X |

FOREIGN PATENT DOCUMENTS

| | | |
|---|---|---|
| 0131792 | 1/1985 | European Pat. Off. |
| 1931906 | 10/1973 | Fed. Rep. of Germany |
| 2516685 | 1/1979 | Fed. Rep. of Germany |
| 3122660 | 12/1982 | Fed. Rep. of Germany |
| 3218549 | 2/1983 | Fed. Rep. of Germany |
| 2442678 | 6/1980 | France |

Primary Examiner—William E. Wayner
Assistant Examiner—Steven E. Warner
Attorney, Agent, or Firm—Herbert L. Lerner; Laurence A. Greenberg

[57] ABSTRACT

A steam generator having a tube sheet, tubes ending in the tube sheet, a chamber adjoining the tube sheet having an access opening formed therein and a device disposed in the chamber for inserting a sleeve into one of the tubes in a plurality of partial insertion strokes, the inserting device includes a movable clamping device holding and moving the sleeve in axial direction of the tube in one of the partial insertion strokes, and a stationary clamping device associated with the movable clamping device holding the sleeve during a backstroke of the movable clamping device.

12 Claims, 11 Drawing Figures

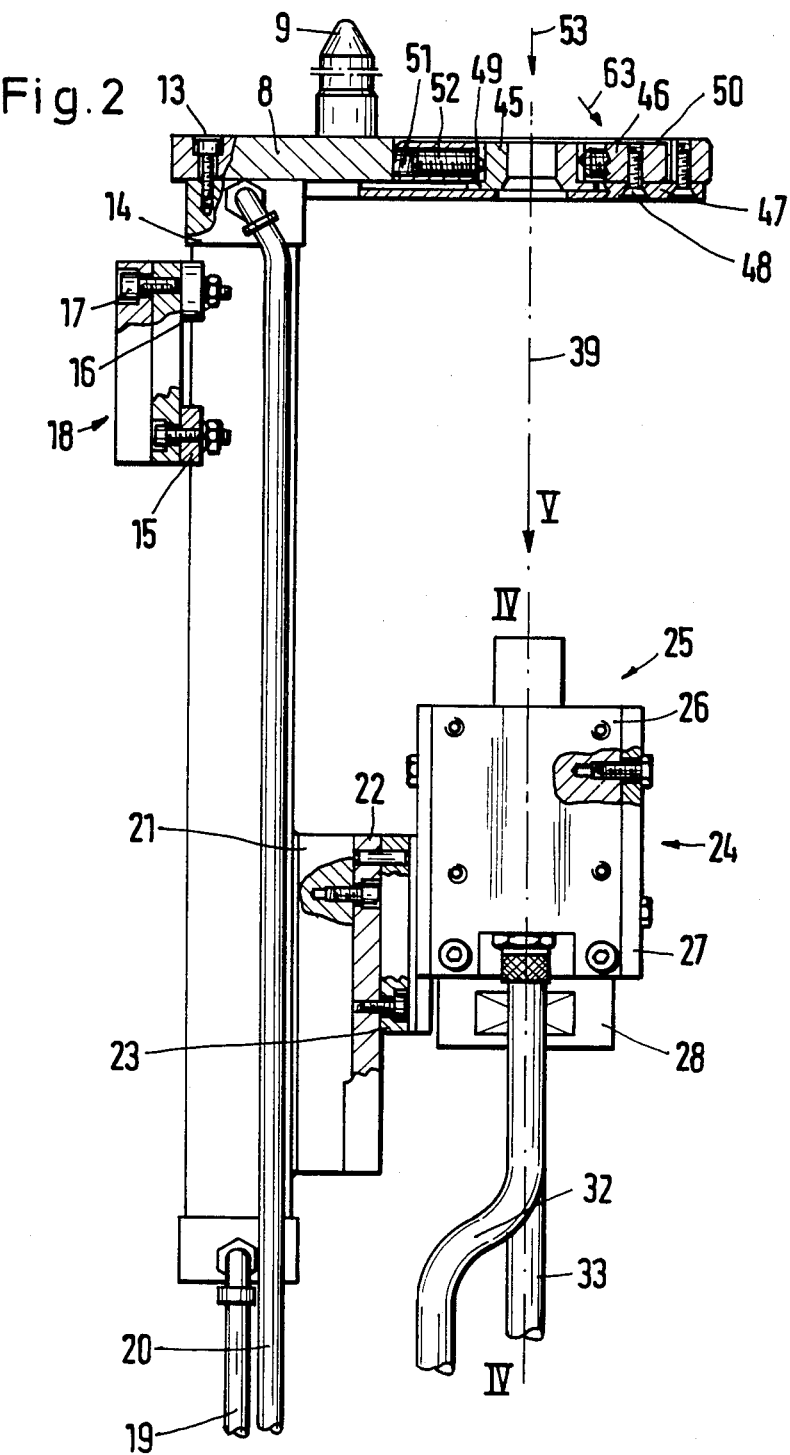

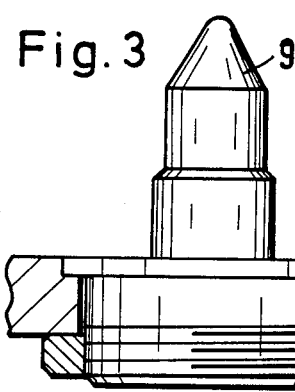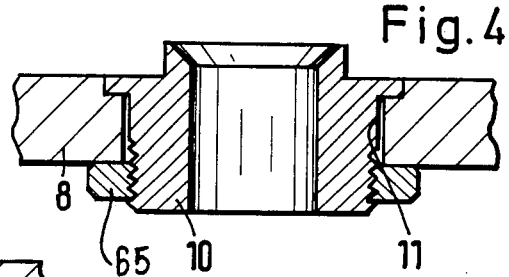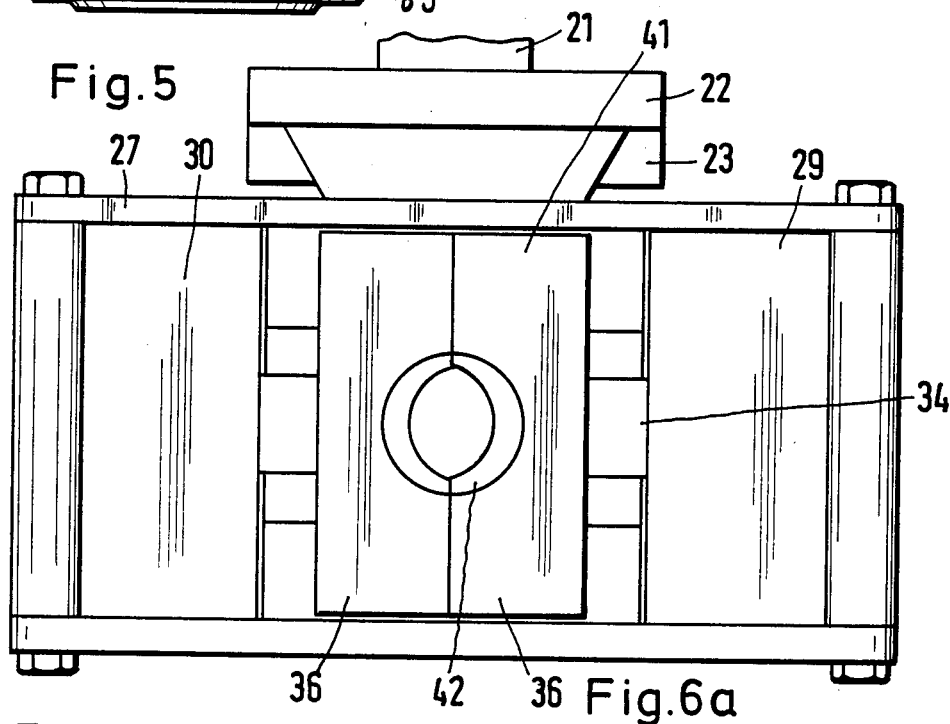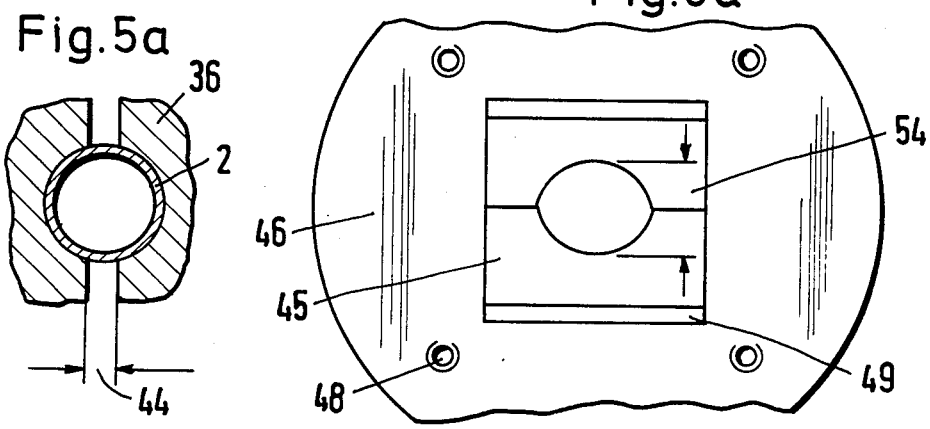

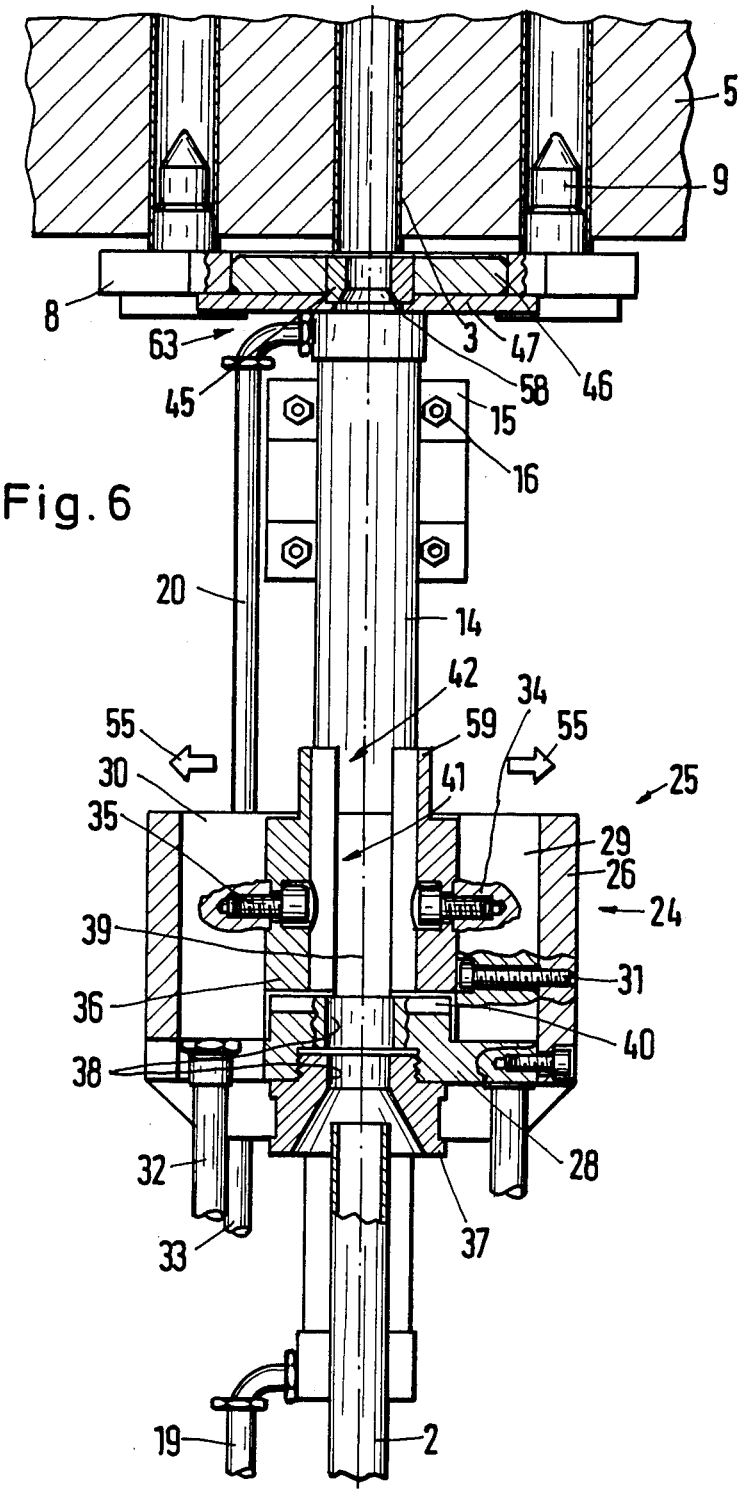

DEVICE FOR PLACING A CYLINDRICAL BODY, ESPECIALLY A SLEEVE, IN A TUBE OF A STEAM GENERATOR

The invention relates to a device for inserting a cylindrical body, especially a sleeve, into a tube ending in a tube sheet of a steam generator, the steam generator having a chamber adjoining the tube sheet being accessible through an opening in the chamber.

Such a sleeve for a steam generator which is generally known is disclosed in German Published, Prosecuted Application DE-AS No. 25 16 685. However, in that device only the fastening of the sleeve by means of an explosive force is described. Nothing is said therein about the insertion of such a sleeve into the defective tube. Heretofore, in order to insert the sleeve, a person had to climb through a manhole into a chamber preceding a tube sheet and had to slide the sleeve into the tube ending in the tube sheet, using a gripper. Entering the chamber is undesirable, especially in steam generators of nuclear plants, because exposure to radiation cannot be precluded.

It is accordingly an object of the invention to provide a device for placing a cylindrical body, especially a sleeve, in a tube of a steam generator, which overcomes the hereinafore-mentioned disadvantages of the heretofore-known devices of this general type, and which does not require entry into the steam generator chamber by operating personnel.

With the foregoing and other objects in view there is provided, in accordance with the invention, a steam generator having a tube sheet, tubes ending in the tube sheet, a chamber adjoining the tube sheet having an access opening formed therein, and a device disposed in the chamber for inserting a cylindrical body, especially a sleeve, into one of the tubes in a plurality of partial insertion strokes, the inserting device including a movable clamping or tightening device holding and moving the sleeve in axial direction of the tube in one of the partial insertion strokes, and a stationary clamping or tightening device associated with the movable clamping device holding the sleeve during a backstroke of the movable clamping device.

Due to the insertion being carried out in several partial strokes, the clamping or tightening device which can be moved in the axial direction of the steam generator tube, can have a small overall height, so that even with a spherical chamber, such sleeves can still be inserted in tube positions near the periphery without difficulty.

In accordance with another feature of the invention, there is provided a mounting plate being fixed in position relative to the tube sheet, the stationary clamping device being integrated in the mounting plate.

In accordance with a further feature of the invention, there is provided a cylinder without piston rods supported by the mounting plate, the cylinder being actuated by a pressure medium and having a piston and a bracket protruding from the piston at the periphery of the cylinder, and means for detachably connecting the movable clamping device to the bracket. By using the mounting plate for accepting the stationary clamping device as well as for holding the clamping device which is movable in the axial direction of the steam generator tubes, a compact weight-saving device is created. Easy interchangeability of the clamping device with another device, such as for welding the sleeves, is ensured by the detachable connection between the bracket and the clamping device.

In accordance with an added feature of the invention, there is provided an insert in which the stationary clamping device is disposed, and means for detachably fastening the insert to the mounting plate. The empty space formed after the removal of this insert permits a tool or a testing device to be brought to a tube position. Such a tool can be held in a tightening device which is movable in the axial direction of the steam generator tubes or can be fastened to the cylinder instead of this tightening device.

In accordance with an additional feature of the invention, the mounting plate includes interchangeable centering elements or a spreading finger for centering the mounting plate relative to the tube sheet. This is done so that the holding device can be selectively centered at the inner or outer periphery of the steam generator tube.

In accordance with again another feature of the invention, the stationary clamping device includes clamping pieces having conically enlarged sides facing away from the tube sheet for receiving the sleeve therebetween, and resilient pressure pieces moving the clamping pieces against each other in a relieved position defining a clamping diameter between the clamping pieces being smaller than the outside diameter of the sleeve, the resiliant pressure pieces exerting a spring force being weak enough to permit the sleeve to be inserted between and pushed through the clamping pieces but strong enough to support the weight of the sleeve after the termination of the strokes. With this construction, the insertion of a sleeve by partial strokes is made possible in a simple manner. During the insertion stroke of the tightening device which is movable in the axial direction of the steam generator tubes, the insertion of the sleeve is not impeded, and during the backstroke, the sleeve is held in the position it has reached.

In accordance with again a further feature of the invention, the mounting plate has guide slots formed therein, and the clamping pieces are shell shaped and include tabs extending from the outer periphery of the clamping pieces and protruding into the guide slots. This is done in order to permit accurate guidance of the clamping pieces perpendicular to the sleeve axis.

In accordance with again an added feature of the invention, the clamping pieces have bevels formed thereon defining larger and smaller diameters, and the movable clamping device includes a housing with an upper edge and two clamping jaws being movable toward each other and toward a sleeve to be held into a contracted position and being movable away from each other in the housing, the clamping jaws including respective clamping regions having respective portions thereof disposed between the upper edge of the houding and the mounting plate, in the contracted position when the sleeve is not located in the clamping regions, the portions being spaced apart by a distance being larger than the inside diameter of one of the tubes and smaller than the larger diameter of the bevel of the clamping device. This structure ensures that, for inserting the sleeve into its end position, the contracted clamping jaws can engage under the sleeves, can have their end faces contact the end face of the sleeve and can reliably push apart the clamping pieces of the stationary clamping device in the last partial stroke and pass through them.

In accordance with again an additional feature of the invention, there are provided means for guiding the clamping jaws during motion thereof relative to the housing in a form-locking manner. A form-locking connection is one which is formed by the shape of the elements themselves, as opposed to a force-locking connection requiring external forces. This is done to ensure exact guidance of the clamping jaws.

In accordance with yet another feature of the invention, there is provided a coupling piece engaging the surface of the cylinder, and a manipulator for testing the tubes being disposed in the chamber and attached to the coupling piece for supporting the insertion device.

In accordance with a concomitant feature of the invention, there is provided at least one spreading finger extending from the mounting plate and protruding into one of the tubes for supporting the inserting device.

Other features which are considered as characteristic for the invention are set forth in the appended claims.

Although the invention is illustrated and described herein as embodied in a device for placing a cylindrical body, especially a sleeve, in a tube of a steam generator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 2 is an enlarged, fragmentary, side-elevational view of the device, partially in cross section;

FIGS. 3 and 4 are further enlarged fragmentary, partially cross-sectional views showing centering elements and the fastening thereof in the device;

FIG. 5 is an enlarged, fragmentary, top-plan view taken in the direction of the arrow V in FIG. 2;

FIG. 5a is an enlarged, fragmentary, cross-sectional view taken in the direction of the arrow 43 in FIG. 7;

FIGS. 6 to 9 are fragmentary, partly cross-sectional and partly broken-away front-elevantional views showing different operating positions of the device; and FIG. 6a is an enlarged, fragmentary, top-plan view taken in the direction of the arrow 53 in FIG. 2.

Figure 1:
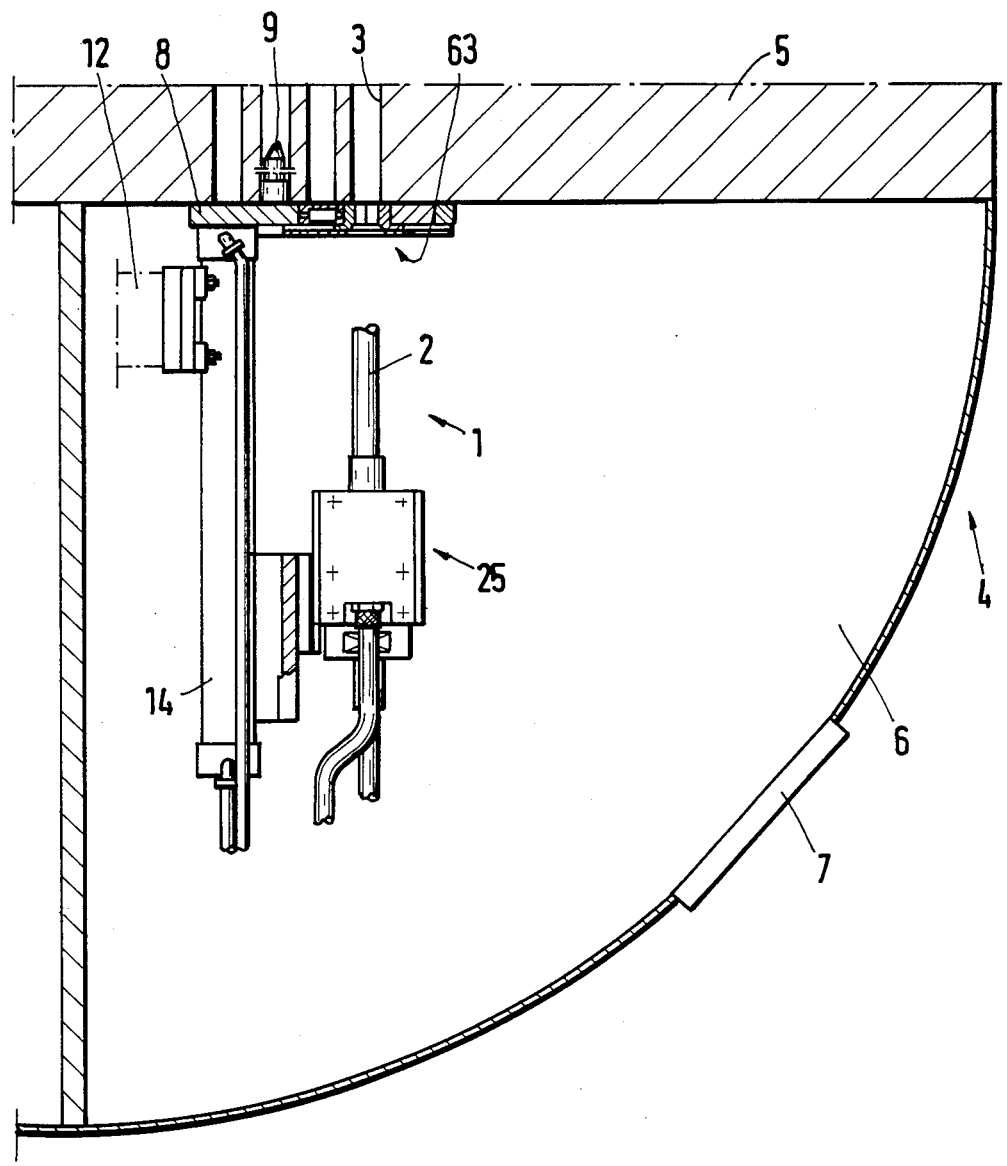
FIG. 1 is a fragmentary, diagrammatic, longitudinal-sectional view of a chamber of a steam generator with the device according to the invention.

Referring now to the figures of the drawings and first particularly to FIG. 1 thereof, there is seen an overall view of the disposition of a device 1 for inserting a sleeve 2 into a tube 3 of a steam generator 4. The only parts of the steam generator which are illustrated are a tube sheet 5 in which several thousand tubes 3 may end and an hemispherical chamber 6 adjoining the tube sheet 5. The chamber 6 and therefore every tube 3 ending in the tube sheet 3, are accessible through an opening 7.

The device which is shown in FIG. 2 on a larger scale, is placed in the chamber 6 through the opening 7 and is fixed relative to the tube sheet 5. In order to position the device 1, centering pins 9 which can be inserted into a tube 3 of the tube sheet 5, are attached to a mounting plate 8. The centering pins 9 can also be replaced by centering discs 10 shown in FIG. 4 which extend over a tube 3 protruding from an appropriately constructed tube sheet into the chamber 6 at the periphery thereof.

FIGS. 3 and 4 show that the respective receiving hole 11 in the mounting plate 8 for the centering pin 9 or the centering disc 10 are of identical form. The use of a centering pin 9 or a centering disc 10 is therefore optional. The centering pin 9 or the centering disc 10 are secured relative to the mounting plate 8 by a nut 65. A non-illustrated spreading finger can also be inserted into the receiving hole 11 for holding the mounting plate 8 relative to the tube sheet 5. In the illustrated embodiment, however, the device 1 is held by a manipulator 12 which is also disposed in the chamber 6 and is known, for instance, from German Published, Non-Prosecuted Application DE-OS No. 31 22 660, corresponding to allowed U.S. application Ser. No. 385,922, now U.S. Pat. No. 4,673,027. A cylinder 14 having two straps 15 but having no piston rod is fastened to the lower surface of the mounting plate 8 by means of screws 13 and is actuated by a pressure medium. A coupling piece 18 is fastened to the straps 15 by screws 16, 17. The coupling piece 18 engages a corresponding counter piece of the manipulator 12 which is indicated in phantom in FIG. 1. A non-illustrated piston of the cylinder 14 can be controlled through two pneumatic connections 19, 20. A bracket 21 which supports a prismatic guide 23 with the interposition of a plate 22, is extended from the piston. Screw and pin connections secure these parts in their position A housing 24 of a clamping or tightening device 25 has a counter piece for the prismatic guide 23 which establishes a self-locking hold between the tightening device 25 and the bracket 21 The tightening device 25 is thus movable in the axial direction of the tubes 3 by the piston of the cylinder 14.

FIGS. 6 to 9 show, among other things, the tightening device 25 sectioned along the line IV—IV of FIG. 2, including two tightening cylinders 29, 30 operating in opposite directions and being disposed in the housing 24. The housing 24 is formed of bolted-together side plates 26, front plates 27 and a base plate 28. The cylinders 29, 30 are each fastened by means of screws 31 to a respective side part 26. The cylinders 29, 30 are controlled through pneumatic connections 32, 33. The clamping cylinders 29, 30 have piston rods 34, each of which support a shell-shaped clamping jaw 36 through a screw 35 for holding the sleeve 2. Screwed into the base plate 28 is a guiding piece 37 which is conically enlarged toward the bottom and is provided with a hole 38 acting as an extension of the base plate 28. The holes 38 have the same central axis 39 as the jaws 36 and have a diameter which is so large that the sleeve can easily be brought through it into the tightening range of the clamping or tightening device 25. The clamping jaws 36 are guided during a closing and an opening motion thereof so as to slide in a slot and key connection 40 existing between them and the base plate 28, so that an exact execution of the motion is assured. As can be seen in connection with FIG. 5 (which only shows the completely contracted clamping jaws 36 as seen in the direction of the arrow V of FIG. 2), a partial region 41 of the clamping jaws 36 within the housing 24 has a rectangular cross section. A partial region 42 of the clamping jaws 36 located outside the housing 24 is set back in such a manner that it has the same outside diameter as a tube 3 ending in the tube sheet 5. FIG. 5a shows the clamping jaws 36 with a sleeve 2 clamped between them in a view taken in the direction of the arrow 43 in FIG. 7. As can be seen from the slot width between the clamping jaws 36, the jaws are closer together if they occupy the position described in connection with FIG. 5. The purpose of this construction will be discussed below.

Clamping pieces 45 are associated with the mounting plate 8 in the extension of the central axis 39 of the clamping jaws 36 of the clamping or tightening device 25 which is movable in the axial direction of the tubes 3. A disc 46 disposed in a recess formed in the mounting plate 8 and a cover 47 serve as the holder for the clamping piece. The cover 47 is connected to the mounting plate 8 as well as to the disc 46 by screws 48. Tapped holes 51 are made in the disc 46 parallel to the lateral surfaces 50 of the disc, which accommodate resilient pressure pieces 52. In their relieved position, the pressure pieces push the clamping pieces 45 in the position shown in FIG. 6a, which is a view of FIG. 2 as seen in the direction of the arrow 53. In this position, the clamping width 54 of the clamping pieces 45 is smaller than the outside diameter of the sleeve 2. Tabs 49 which extend laterally from the clamping pieces 45 guide the clamping pieces with a sliding fit during their shifting motion between one lateral surface of the disc 46 and a recess in the cover 47. Jamming is therefore impossible. The disc 46, the clamping pieces 45, the cover 47 and the resilient pressure pieces 52 form another clamping or tightening device 63 attached to the mounting plate 8 in a stationary manner.

The operation of the device will be explained, making reference to FIGS. 6 to 9.

According to FIG. 6, the clamping jaws 36 of the tightening device 25 are moved in the direction of the arrow 55 into their open position. The sleeve 2 is pushed by hand or by non-illustrated gripping pliers through the conically enlarged guide piece 37 into the clamping range of the tightening device 25. The closing motion of the clamping jaws 36 is executed by a non-illustrated control console and through the clamping cylinders 29, 30, in the direction of the arrow 56 in FIG. 7. The sleeve is therefore in the position shown in FIG. 7 and is held by the clamping or tightening device 25.

Figure 8:
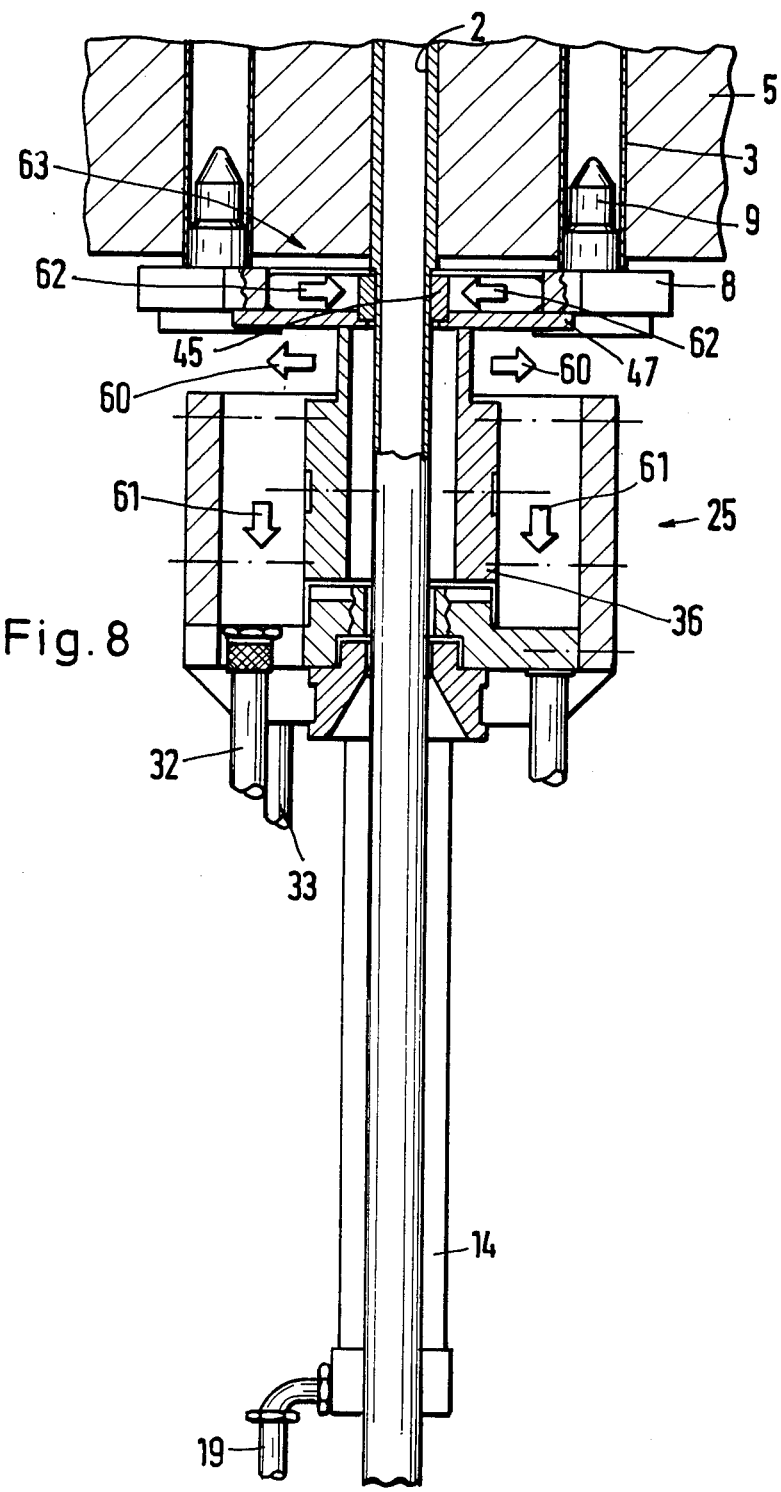
Figure 9:
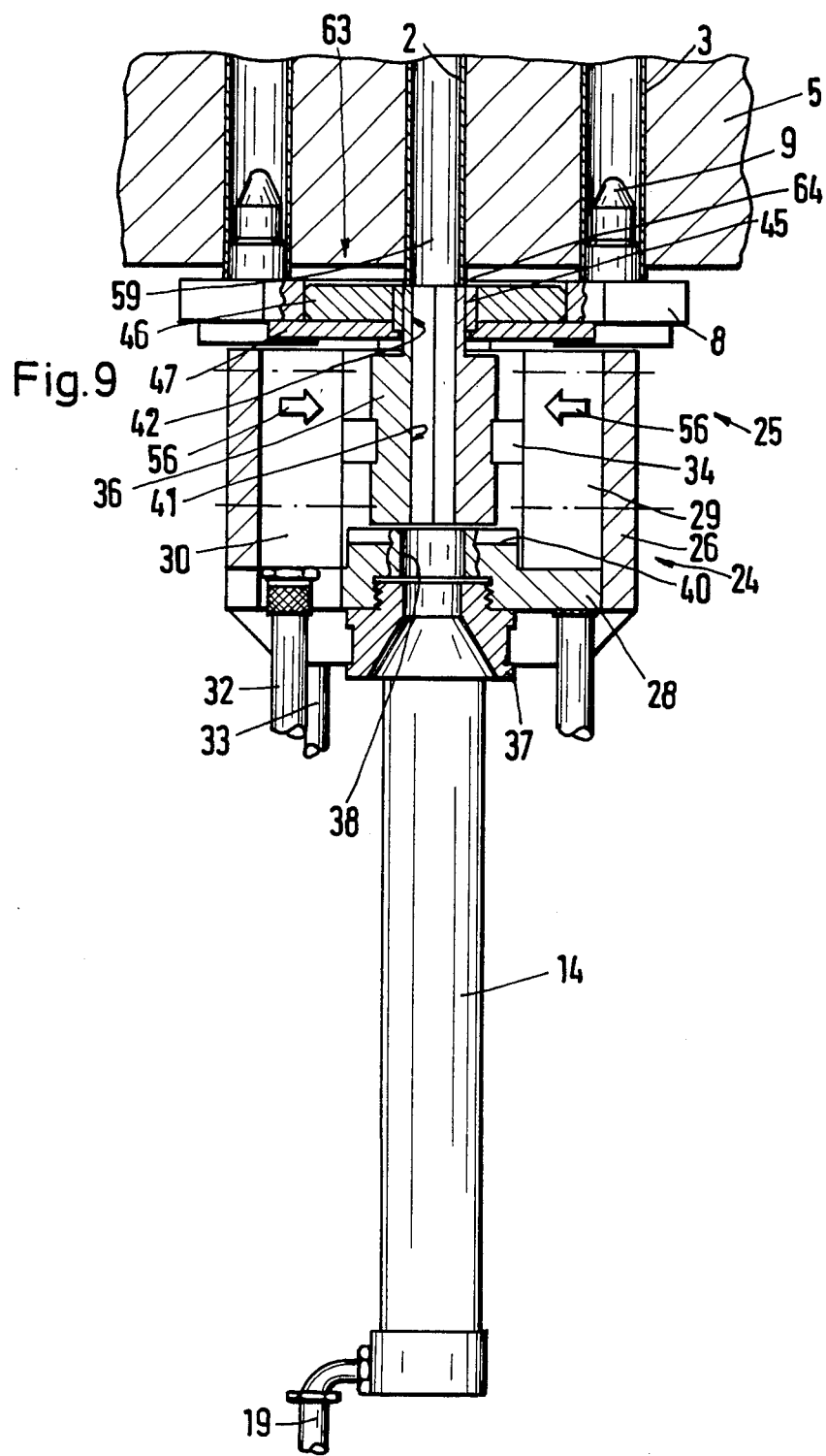

Only a first partial stroke of the tightening device 25 is executed, which it carries out by traversing the cylinder 14 which does not have a piston rod, in the direction of the arrow 57. The sleeve 2 abuts against the clamping pieces 45 in the vicinity of a bevel or conical enlargement 58. The clamping pieces 45 are pushed apart by the sleeve 2 against the force of the resilient clamping pieces 52 shown in FIG. 2, so that the sleeve is inserted with sliding friction relative to the clamping surfaces of the clamping pieces 45, into a tube 3 of the steam generator 4. The partial stroke is continued until the end of the clamping jaws 36 hits the cover 47 of the mounting plate 8 as shown in FIG. 8. The progress of the partial stroke is monitored by a non-illustrated television camera and the end of the stroke is controlled by non-illustrated end switches.

Figure 7:
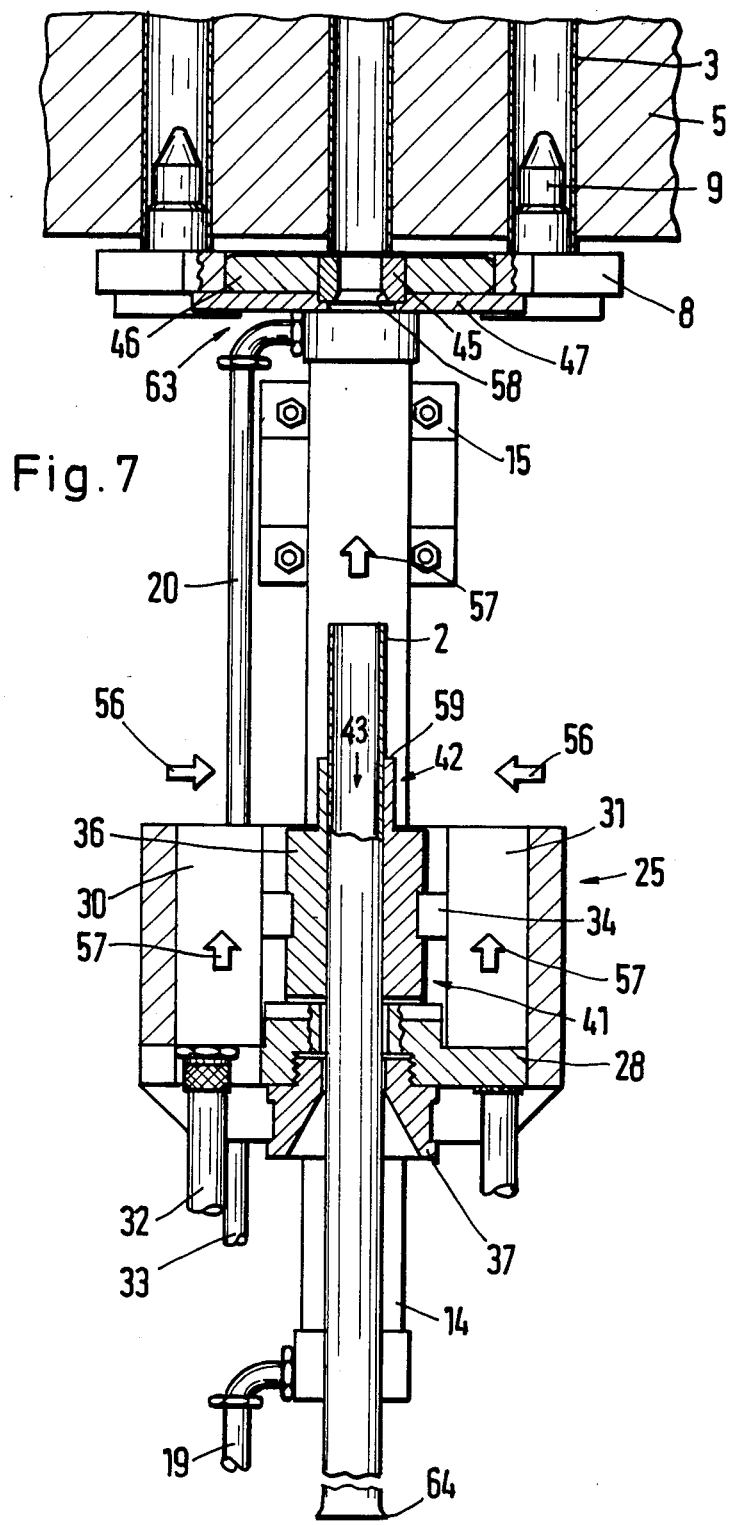

FIG. 8 shows that after the termination of a partial stroke, the clamping jaws 36 of the tightening device 25 open in the direction of the arrow 60, in order to execute a backstroke of the device 25 in the direction of the arrow 61 without the sleeve. The resilient pressure pieces 52 acting in the direction of the arrow 62 forcibly push the clamping pieces of the stationary clamping device 63 against the peripheral surface of the sleeve 2 and thus hold the clamping pieces in the position reached after the partial stroke. In order to permit any transfer of the sleeve 2 to the stationary clamping or tightening device 63 during the first partial stroke, it is necessary for the sleeve to protrude a certain amount beyond the end faces of the clamping jaws 36 as seen in FIG. 7, when inserting the sleeve into the movable clamping or tightening device 25 which is movable in the axial direction of the steam generator tubes.

After the completion of the backstroke, the clamping jaws 36 grip the sleeve 2 again and insert it further into a steam generator tube 3 in a further partial stroke, overcoming the friction between the clamping pieces 45 and the sleeve 2. The spring force of the pressure pieces 52 is adjusted in this case in such a way that they enable the sleeve 2 to be pushed through but they also hold the sleeve in its position during the backstroke of the tightening device 25.

The partial strokes are continued in the manner described, until the end face 59 of the clamping jaws 36 can reach under the lower end of the sleeve 2, after a backstroke. The clamping jaws 36 are contracted in the process into the position described in connection with FIG. 5. The outside diameter of the stepped-back portion or partial region 42 of the clamping jaws 36 assumes a dimension which is larger than the inside diameter of a steam generator tube 3. Preferably, the outside diameter of the stepped-back portion or partial region 42 is as large as that of a steam generator tube 3. During the last partial stroke which is then executed, the end faces 59 of the clamping jaws 36 come to rest against the lower surface of the sleeve 2, which as a rule is provided with a knurl 64. The tightening device 25 then occupies the position shown in FIG. 9 at the end of the last partial stroke. The contracted clamping jaws 36 of the tightening device 25 have then moved through the clamping pieces after running up against the bevel 58 of the clamping pieces 45 of the stationary clamping device 63 until the knurl 64 of the sleeve 2 comes to rest at the end face of the steam generator tube 3. If a sleeve 2 without a knurl is used, the partial stroke is continued until the end faces 59 of the clamping jaws 36 come to rest against the end face of the steam generator tube 3. The movement of the clamping pieces 45 through the clamping jaws 36 ensures accurate positioning of the lower sleeve end relative to the end face of a steam generator tube 3 ending in the tube sheet 5. The outer periphery of the lower end of the sleeve 2 is provided with non-illustrated knubs over a length of approximately 10 mm, which cause a slight amount of clamping between the steam generator tube 3 and the sleeve 2. This clamping holds the sleeve in its position after the tightening device is removed, until it is fastened to the steam generator tube 3 by welding.

Advantageously, the entire stationary clamping device 63 can be removed by loosening the screw 48 shown in FIG. 2. The empty space thus created around the steam generator tube 3 equipped with the sleeve 2, permits welding of the sleeve by means of a welding device which can be inserted through the prismatic guide 23 instead of the tightening device 25.

The foregoing is a description corresponding in substance to German Application P No. 35 09 177.0, filed Mar. 14, 1985, the International priority of which is being claimed for the instant application, and which is hereby made part of this application. Any material discrepancies between the foregoing specification and the aforementioned corresponding German Application are to be resolved in favor of the latter.

I claim:

1. In a steam generator having a tube sheet, tubes ending in the tube sheet and a chamber adjoining the tube sheet having an access opening formed therein, the improvement comprising a device disposed in the chamber for inserting a sleeve into one of the tubes in a plurality of partial insertion strokes, said inserting device including a movable clamping device holding and moving the sleeve in axial direction of the tube in one of said partial insertion strokes, and a stationary clamping device associated with said movable clamping device holding the sleeve during a backstroke of said movable clamping device.

2. Device according to claim 1, including a mounting plate being fixed in position relative to the tube sheet, said stationary clamping device being integrated in said mounting plate.

3. Device according to claim 2, including an insert in which said stationary clamping device is disposed, and means for detachably fastening said insert to said mounting plate.

4. Device according to claim 2, wherein said mounting plate includes interchangeable centering elements for centering said mounting plate relative to the tube sheet.

5. Device according to claim 2, wherein said mounting plate includes a spreading finger for centering said mounting plate relative to the tube sheet.

6. Device according to claim 2, including at least one spreading finger extending from said mounting plate and protruding into one of said tubes for supporting said inserting device.

7. Device according to claim 2, including a cylinder supported by said mounting plate, said cylinder being actuated by a pressure medium and having a piston and a bracket protruding from said piston at the periphery of said cylinder, and means for detachably connecting said movable clamping device to said bracket.

8. Device according to claim 7, including a coupling piece engaging the surface of said cylinder, and a manipulator for testing the tubes being disposed in the chamber and attached to said coupling piece for supporting said inserting device.

9. Device according to claim 2, wherein said stationary clamping device includes clamping pieces having conically enlarged sides facing away from the tube sheet for receiving the sleeve therebetween, and resilient pressure pieces moving said clamping pieces against each other in a relieved position defining a clamping diameter between said clamping pieces being smaller than the outside diameter of the sleeve, said resilient pressure pieces exerting a spring force being weak enough to permit the sleeve to be inserted between and pushed through said clamping pieces but strong enough to support the weight of the sleeve after the termination of said strokes.

10. Device according to claim 9, wherein said mounting plate has guide slots formed therein, and said clamping pieces are shell shaped and include tabs extending from the outer periphery of said clamping pieces and protruding into said guide slots.

11. Device according to claim 9, wherein said clamping pieces have bevels formed thereon defining larger and smaller diameters, and said movable clamping device includes a housing with an upper edge and two clamping jaws being movable toward each other and toward a sleeve to be held into a contracted position and being movable away from each other in said housing, said clamping jaws including respective clamping regions having respective portions thereof disposed between said upper edge of said housing and said mounting plate, in said contracted position when the sleeve is not located in said clamping regions, said portions being spaced apart by a distance being larger than the inside diameter of one of the tubes and smaller than the larger diameter of said bevel of said clamping pieces.

12. Device according to claim 11, including means for guiding said clamping jaws during motion thereof relative to said housing.

* * * * *